(12) United States Patent
Lee et al.

(10) Patent No.: US 8,269,920 B2
(45) Date of Patent: Sep. 18, 2012

(54) BACKLIGHT UNIT AND DISPLAY DEVICE HAVING OPTICAL SHEET SPACED FROM FRAME

(75) Inventors: Jung Ho Lee, Seoul (KR); Bang Gun Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/112,708

(22) Filed: May 20, 2011

(65) Prior Publication Data

US 2011/0255025 A1  Oct. 20, 2011

(30) Foreign Application Priority Data

May 28, 2010 (KR) ........................ 10-2010-0050390

(51) Int. Cl.
*G02F 1/1333* (2006.01)
*G02F 1/1335* (2006.01)

(52) U.S. Cl. ............ 349/69; 349/58; 362/612; 362/633; 362/634; 362/97.3

(58) Field of Classification Search .................... 349/58, 349/69; 362/612, 632–634, 97.1–97.3
See application file for complete search history.

(56) References Cited

U.S. PATENT DOCUMENTS

| 2003/0179580 | A1 | 9/2003 | Ito et al. | |
|---|---|---|---|---|
| 2004/0212755 | A1* | 10/2004 | Fukayama et al. | 349/58 |
| 2006/0290836 | A1* | 12/2006 | Chang | 349/58 |
| 2007/0103908 | A1* | 5/2007 | Tabito et al. | 362/294 |
| 2007/0222910 | A1* | 9/2007 | Hu | 349/58 |
| 2009/0225252 | A1* | 9/2009 | Jeong | 349/58 |

FOREIGN PATENT DOCUMENTS

| JP | 2002-116440 A | 4/2002 |
|---|---|---|
| JP | 2005-100692 A | 4/2005 |
| KR | 10-2004-0005495 A | 1/2004 |
| KR | 10-2004-0035122 A | 4/2004 |
| KR | 10-2006-0078676 A | 7/2006 |

* cited by examiner

*Primary Examiner* — Michael Caley
(74) *Attorney, Agent, or Firm* — Birch, Stewart, Kolasch & Birch, LLP

(57) ABSTRACT

A backlight unit is disclosed. The backlight unit includes a light emitting device, a light guide plate to guide light irradiated from the light emitting device, an optical sheet disposed on a front surface of the light guide plate, a bottom chassis disposed below the light guide plate, a mold frame disposed on a front surface of the optical sheet, and an anti-contact protrusion disposed at the bottom chassis so as to come into contact with the mold frame, thereby allowing the mold frame to be spaced apart from the light guide plate and the front surface of the optical sheet.

18 Claims, 5 Drawing Sheets

BACKLIGHT UNIT AND DISPLAY DEVICE HAVING OPTICAL SHEET SPACED FROM FRAME

This application claims the benefit of Korean Patent Application No. 10-2010-0050390, filed on May 28, 2010, which is hereby incorporated by reference as if fully set forth herein.

BACKGROUND

The embodiment disclosure relates to a backlight unit and a display device.

Generally, Liquid Crystal Displays (LCDs) have higher visibility than Cathode Ray Tubes (CRTs) and less average power consumption and heat emission than the same screen size of CRTs. For this reason, LCDs have been widely used in mobile phones, computer monitors and televisions, along with plasma display devices or field emission display devices.

The driving principle of LCDs is based on optical isotropy and polarization of liquid crystals. Elongated liquid crystals exhibit directivity in molecular arrangement. Here, the molecular arrangement direction of liquid crystals may be controlled by applying an electric field to liquid crystals.

Accordingly, controlling the molecular arrangement direction of liquid crystals may change molecular arrangement of liquid crystals, whereby image information can be displayed as light is refracted in the molecular arrangement direction of liquid crystals by optical isotropy.

However, LCDs are non-self emissive devices and require a separate light source. One example of the light source is a backlight unit. Specifically, light emitted from a backlight unit disposed behind a liquid crystal panel is introduced into the liquid crystal panel, such that transmittance of light is controlled based on the arrangement of liquid crystals, enabling display of an image.

SUMMARY

Accordingly, the embodiment is directed to a backlight unit and a display device that substantially obviate one or more problems due to limitations and disadvantages of the related art.

An object of the embodiment is to provide a backlight unit and a display device capable of preventing damage to a reflective sheet due to contact between the reflective sheet and a top cover.

Additional advantages, objects, and features of the embodiment will be set forth in part in the description which follows and in part will become apparent to those having ordinary skill in the art upon examination of the following or may be learned from practice of the embodiment. The objectives and other advantages of the embodiment may be realized and attained by the structure particularly pointed out in the written description and claims hereof as well as the appended drawings.

To achieve these objects and other advantages and in accordance with the purpose of the embodiment, as embodied and broadly described herein, a backlight unit includes a light emitting device, a light guide plate to guide light irradiated from the light emitting device, an optical sheet disposed on a front surface of the light guide plate, a bottom chassis disposed below the light guide plate, a mold frame disposed on a front surface of the optical sheet and an anti-contact protrusion disposed at the bottom chassis so as to come into contact with the mold frame, thereby allowing the mold frame to be spaced apart from the light guide plate and the front surface of the optical sheet.

The bottom chassis may include a bottom body parallel to the light guide plate and a sidewall structure disposed at an edge of the bottom body so as to be parallel to a side surface of the light guide plate.

The anti-contact protrusion may be disposed on the sidewall structure.

The anti-contact protrusion may be disposed at an upper surface of the sidewall structure.

The mold frame may include a vertical portion coming into contact with the sidewall structure and an upper rim portion extending from the vertical portion so as to surround an edge region of the front surface of the optical sheet.

The anti-contact protrusion may come into contact with the upper rim portion.

The mold frame may include an anti-contact protrusion inserting recess disposed in an inner surface of the upper rim portion at a position corresponding to the anti-contact protrusion so as to be coupled with the anti-contact protrusion.

The anti-contact protrusion may be integrally disposed with the bottom chassis.

The anti-contact protrusion may be disposed at a region not corresponding to the light emitting device.

The anti-contact protrusion may have a dot shape.

The backlight unit may further include a reflective sheet disposed between the light guide plate and the bottom chassis.

A distance between the mold frame and the optical sheet may be 0.5 mm or less.

An upper end of the anti-contact protrusion may be located higher than the light guide plate.

The backlight unit may further include a bracket attached to the bottom chassis such that the light emitting device is fixed to the bracket.

In accordance with another aspect of the embodiment, a display device includes a light emitting device, a light guide plate to guide light irradiated from the light emitting device, an optical sheet disposed on a front surface of the light guide plate, a bottom chassis disposed below the light guide plate, a mold frame disposed on a front surface of the optical sheet, an anti-contact protrusion disposed at the bottom chassis so as to come into contact with the mold frame, thereby allowing the mold frame to be spaced apart from the light guide plate and the front surface of the optical sheet, and a liquid crystal panel disposed on a front surface of the mold frame.

It is to be understood that both the foregoing general description and the following detailed description of the embodiment are exemplary and explanatory and are intended to provide further explanation of the embodiment as claimed.

DETAILED DESCRIPTION OF THE EMBODIMENTS

Figure 1:
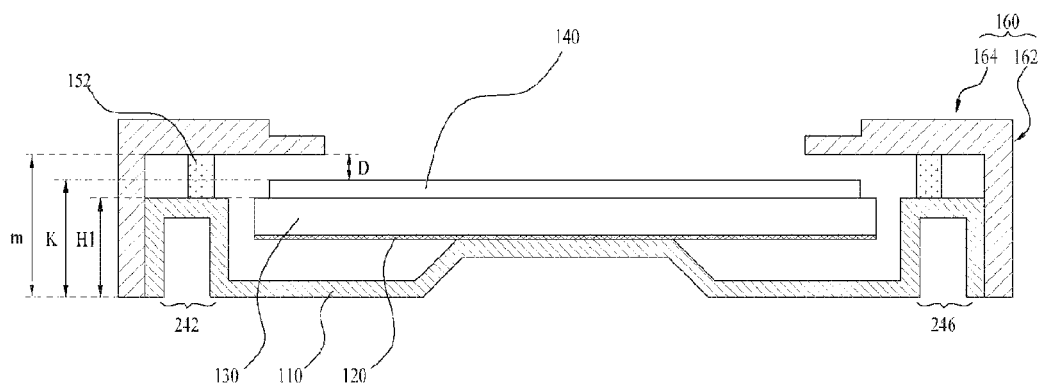
FIG. 1 is a sectional view illustrating a backlight unit according to an embodiment.

Reference will now be made in detail to the embodiments of the present disclosure, examples of which are illustrated in the accompanying drawings.

In addition, the terms "first" and "second" can be selectively or exchangeably used for the members. In the figures, a dimension of each of elements may be exaggerated for clarity of illustration, and the dimension of each of the elements may be different from an actual dimension of each of the elements.

Not all elements illustrated in the drawings must be included and limited to the present disclosure, but the elements except essential features of the present disclosure may be added or deleted. Also, in the descriptions of embodiments, it will be understood that when a layer (or film), a region, a pattern, or a structure is referred to as being 'on/above/over/upper' substrate, each layer (or film), a region, a pad, or patterns, it can be directly on substrate each layer (or film), the region, the pad, or the patterns, or intervening layers may also be present. Further, it will be understood that when a layer is referred to as being 'under/below/lower' each layer (film), the region, the pattern, or the structure, it can be directly under another layer (film), another region, another pad, or another patterns, or one or more intervening layers may also be present.

Therefore, meaning thereof should be judged according to the spirit of the present disclosure.

Figure 2:
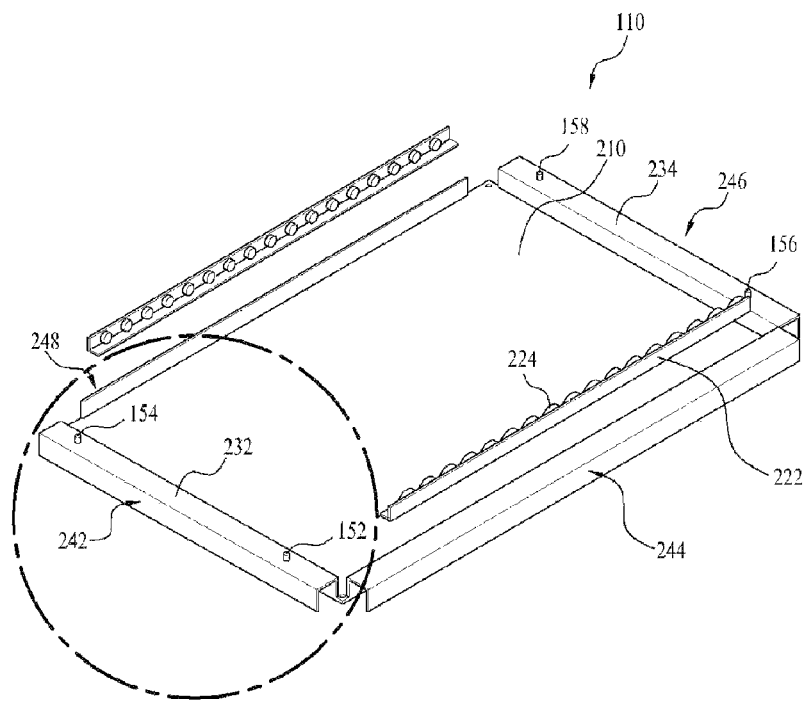
FIG. 2 is a perspective view of a bottom chassis illustrated in FIG. 1.

FIG. 1 is a sectional view illustrating a backlight unit according to an embodiment, and FIG. 2 is a perspective view of a bottom chassis illustrated in FIG. 1. FIG. 2 also illustrates light emitting devices 224 attached to a bracket 222.

Referring to FIGS. 1 and 2, the backlight unit includes a bottom chassis 110, the bracket 222, the light emitting devices 224, a reflective sheet 120, a light guide plate 130, an optical sheet 140, anti-contact protrusions 152, 154, 156 and 158 and a mold frame 160.

The bottom chassis 110 is configured to receive the reflect sheet 120, the light guide plate 130, the optical sheet 140 and the light emitting devices 224 and serve to support the reflect sheet 120, the light guide plate 130 and the optical sheet 140. The bottom chassis 110 may be made of a metal, such as aluminum, zinc, copper, iron, stainless steel and alloys thereof.

More specifically, referring to FIG. 2, the bottom chassis 110 consists of a bottom body 210 parallel to the light guide plate 130 and a sidewall structure located at the edge of the bottom body 210 parallel to a side surface of the light guide plate 130. In this case, the sidewall structure may include four sidewalls 242, 244, 246 and 248.

The sidewalls 242, 244, 246 and 248 of the sidewall structure of the bottom chassis 110 may be provided at upper surfaces thereof with one or more anti-contact protrusions 152, 154, 156 and 158. For example, opposite sidewalls 242 and 246 of the sidewall structure of the bottom chassis 110 may be provided at the upper surfaces 232 and 234 thereof with the anti-contact protrusions 152, 154, 156 and 158 spaced apart from one another. Here, the anti-contact protrusions 152, 154, 156 and 158 may be integrally disposed with the bottom chassis 110.

Although FIG. 2 illustrates the two anti-contact protrusions 152 and 154 or 156 and 158 disposed at the upper surface of each of the sidewalls 242 and 246 facing each other, the anti-contact protrusions may be disposed at the upper surfaces of the other sidewalls 244 and 248 facing each other, and the number of the anti-contact protrusions may need not be limited to two. In addition, the anti-contact protrusions 152, 156, 156 and 158 may take the form of dots. This shape means that the anti-contact protrusions arranged on the same line are separated from each other.

Figure 3:
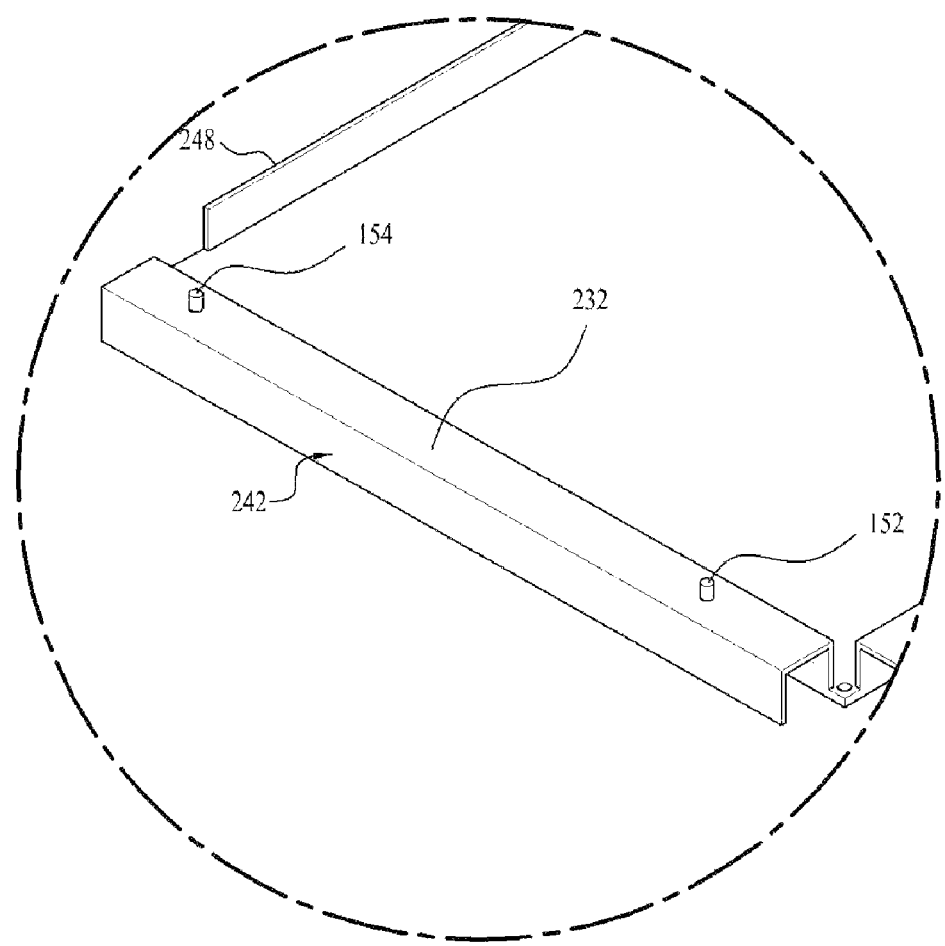
FIG. 3 is an enlarged view illustrating one sidewall of a sidewall structure of the bottom chassis illustrated in FIG. 2.

The sidewalls of the bottom chassis 110 may have various shapes. FIG. 3 is an enlarged view illustrating the sidewall 242 of the bottom chassis 110 illustrated in FIG. 2.

Referring to FIGS. 2 and 3, the sidewalls of the bottom chassis 110 may have an inverted "U"-shaped form, although not limited thereto. For example, although the sidewalls 242, 244 and 246 of the bottom chassis 110 may have an inverted "U"-shaped form, they are not limited thereto.

The light emitting devices 224 serve to generate light and irradiate the light to a light incident surface of the light guide plate 130. The light emitting devices 224 may be semiconductor light emitting devices that may include a board (not shown) and semiconductor Light Emitting Diode (LED) packages. In this case, the board may be a printed circuit board that is attached to the bracket 222. The bracket 222 is attached to the sidewall structure of the bottom chassis 110 and serves to dissipate heat from the light emitting devices 224.

Although FIG. 2 illustrates a two-edge type backlight unit in which the bracket 222, to which the light emitting devices 224 are fixed, is fixed to each of a pair of the sidewalls 244 and 248 facing each other by way of example, the embodiment is not limited thereto.

The light emitting devices 224 are mounted on the board with an interval therebetween and function to irradiate light to the light incident surface of the light guide plate 130. In this case, the light emitting devices 224 mounted on the board may constitute a "Light Emitting Diode (LED) package module".

The light guide plate 130 is disposed on a front surface of the bottom chassis 110 and serves to guide the light irradiated from the light emitting devices 224 in a given direction. Specifically, the light guide plate 130 converts linear light emitted from the light emitting devices 224 into planar light and transmits the converted light to the liquid crystal panel (not shown). The light guide plate 130 may be made of transparent acryl and may be provided with a plurality of dots or V-shaped recesses (not shown) at an upper or lower surface thereof for uniform light reflection.

The reflective sheet 120 is disposed between the bottom chassis 110 and the light guide plate 130 and serves to reintroduce the light exiting a rear surface of the light guide plate 130 into the light guide plate 130.

Figure 7:
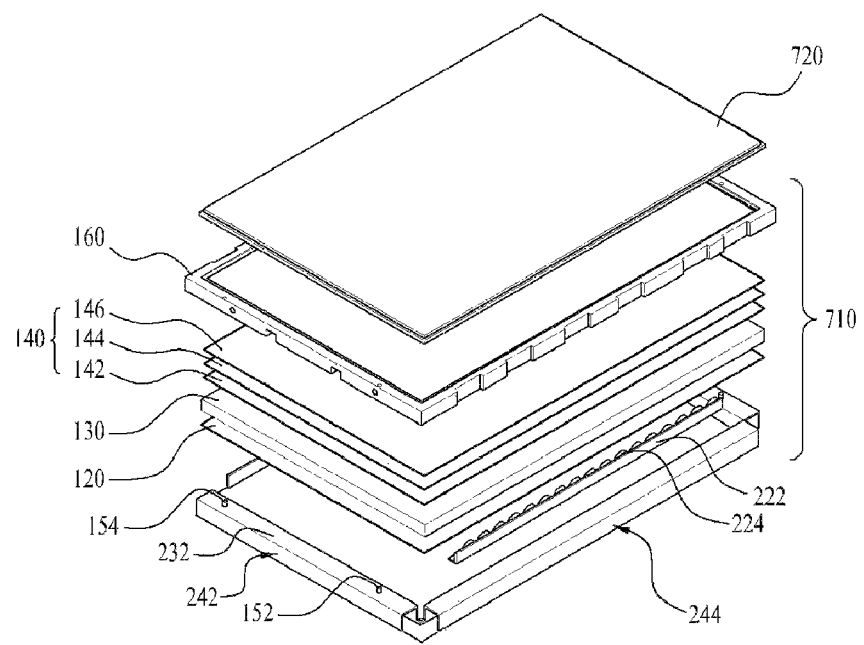
FIG. 7 illustrates a display device according to an embodiment.

The optical sheet 140 is disposed on a front surface of the light guide plate 130 so as to improve properties of light passing therethrough. Referring to FIG. 7, the optical sheet 140 may include a diffusion sheet 142 to diffuse light directed from the light guide plate 130 and a prismatic sheet 144 to vertically emit the light directed from the diffusion sheet 142. Two or more diffusion and prismatic sheets may be appropriately combined.

The optical sheet 140 may further include a protective sheet 146 disposed on the diffusion sheet 142 or the prismatic sheet 144. The protective sheet 146 serves to protect the diffusion sheet 142 and the prismatic sheet 144 that are sensitive to dust or scratches and to prevent movement of the diffusion sheet 142 and the prismatic sheet 144 during transportation of the backlight unit.

The reflective sheet 120 comes into close contact with the front surface of the bottom chassis 110, the light guide plate 130 comes into close contact with a front surface of the reflective sheet 120, and the optical sheet 140 comes into close contact with the front surface of the light guide plate 130.

The mold frame 160 is configured to surround the sidewalls 242, 244, 246 and 248 of the sidewall structure of the bottom chassis 110 and an edge region of a front surface of the optical sheet 140. The mold frame 160 has an opening to expose the optical sheet 140. Specifically, the mold frame 160 includes a vertical portion 162 coming into contact with an outer surface of the sidewall structure of the bottom chassis 110 and an upper rim portion 164 extending inward from the vertical portion 162 to surround the edge region of the front surface of the optical sheet 140. In this case, an inner periphery of the upper rim portion 164 defines the opening to expose the optical sheet 140. The mold frame 160 may include synthesis resine or metal or an alloy of metal.

Figure 4:
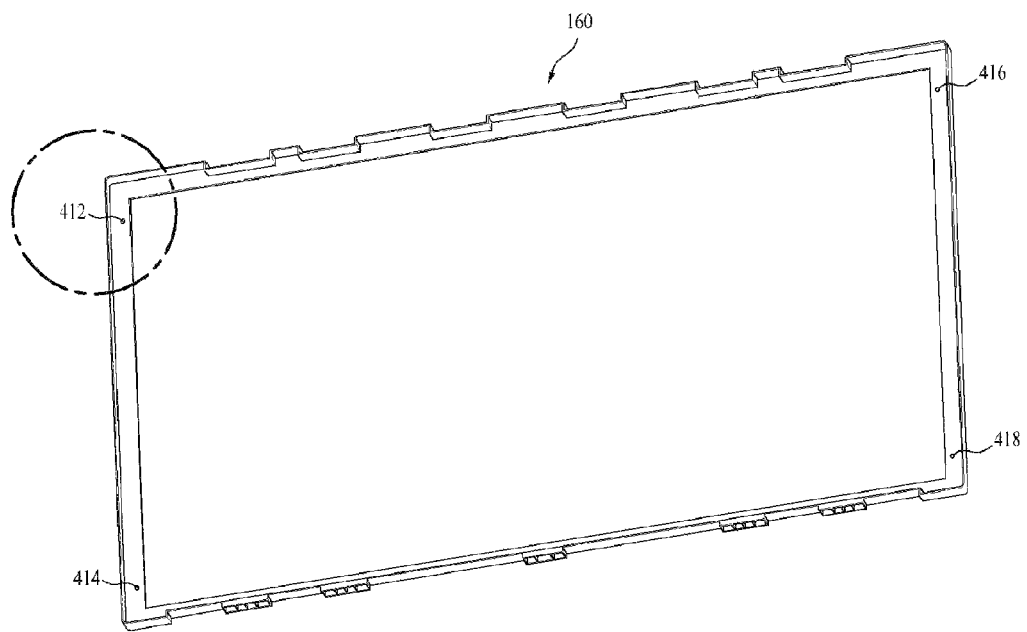
FIG. 4 is a perspective view of a mold frame illustrated in FIG. 1.

FIG. 4 is a perspective view of the mold frame 160 illustrated in FIG. 1. Referring to FIG. 4, the anti-contact protrusions 152, 154, 156 and 158 come into contact with an inner surface of the upper rim portion 164 of the mold frame 160 and support the mold frame 160 such that the inner surface of the upper rim portion 164 of the mold frame 160 is spaced apart from the optical sheet 140.

The inner surface of the upper rim portion 164 of the mold frame 160 is provided with anti-contact protrusion inserting recesses 412, 414, 416 and 418 at positions corresponding to the respective anti-contact protrusions 152, 154, 156 and 158.

Figure 5:
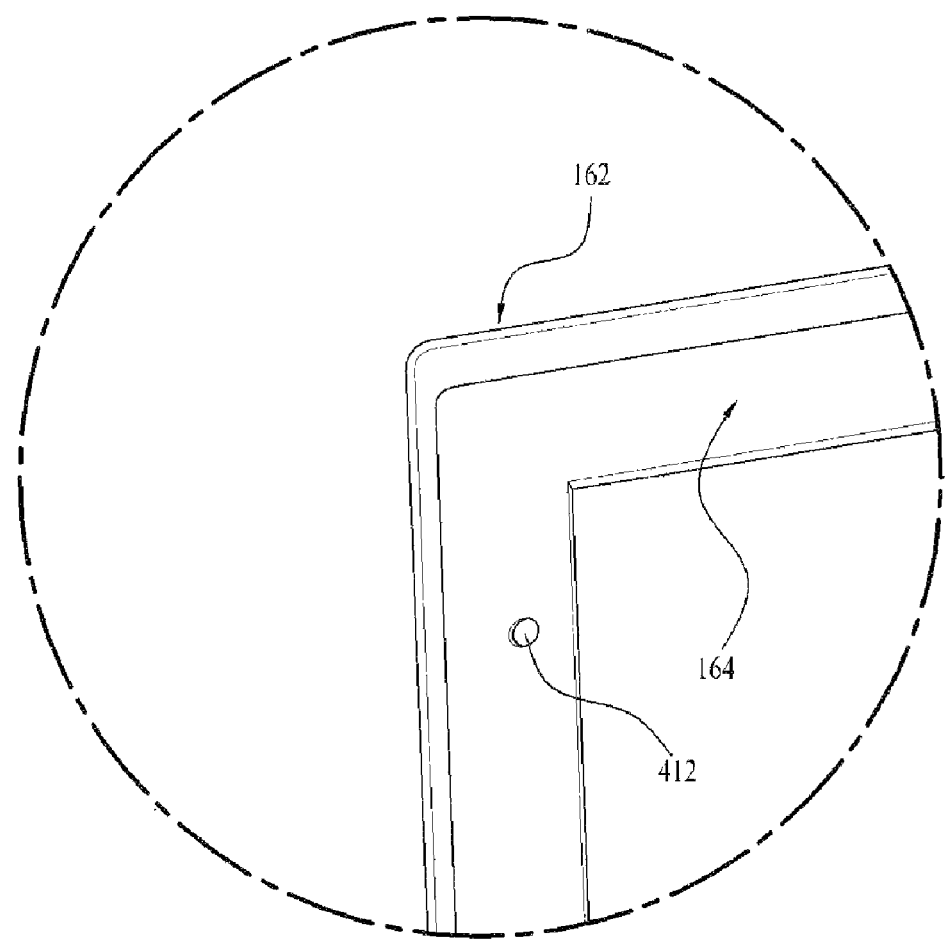
FIG. 5 is an enlarged perspective view of an anti-contact protrusion inserting recess illustrated in FIG. 4.

FIG. 5 is an enlarged perspective view of the anti-contact protrusion inserting recess 412 illustrated in FIG. 4. Referring to FIG. 5, the anti-contact protrusion inserting recesses 412, 414, 416 and 418 are disposed in the inner surface of the upper rim portion 164 of the mold frame 160 at positions corresponding to the anti-contact protrusions 152, 154, 156 and 158, such that the anti-contact protrusions 152, 154, 156 and 158 are fitted into and coupled with the anti-contact protrusion inserting recesses 412, 414, 416 and 418.

Figure 6:
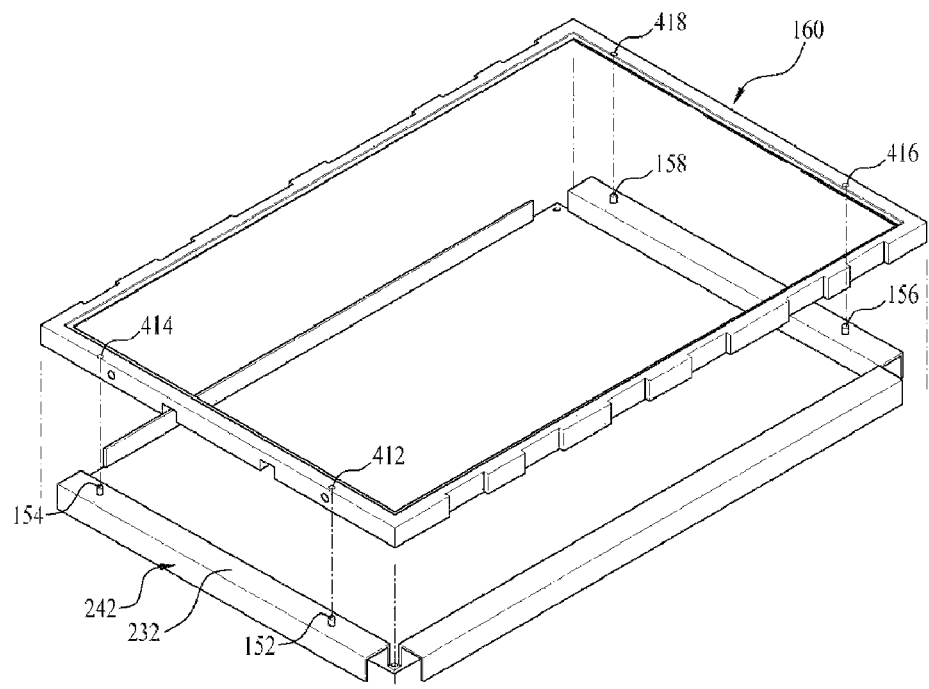
FIG. 6 is a perspective view illustrating a coupling relationship between an anti-contact protrusion and the anti-contact protrusion inserting recess according to an embodiment.

FIG. 6 is a perspective view illustrating a coupling relationship between the anti-contact protrusions 152 and 154 and the anti-contact protrusion inserting recesses 412 and 414 according to an embodiment. Referring to FIG. 6, the anti-contact protrusions 152, 154, 156 and 158 are fitted into the corresponding anti-contact protrusion inserting recesses 412, 414, 416 and 418 respectively. Through such coupling, the mold frame 160 is stably fixed to the bottom chassis 110 and this may prevent damage to the optical sheet 140 due to movement of the mold frame 160.

The mold frame 160, which is supported using the anti-contact protrusions 152, 154, 156 and 158, may be spaced apart from the optical sheet 140 located on the front surface of the light guide plate 130 by a predetermined distance D. In this case, the distance D between the mold frame 160 and the optical sheet 140 may be 0.5 mm or less.

To allow the mold frame 160 to be spaced apart from the optical sheet 140 located on the front surface of the light guide plate 130 by the predetermined distance D, an upper end of the anti-contact protrusion 152, 154, 156 or 158 disposed in the bottom chassis 110 may be located higher than the optical sheet 140 or the light guide plate 130. That is, in FIG. 1, "m" must be greater than "K" or "H1".

In FIG. 1, an upper end of the sidewall structure of the bottom chassis 110 is at the same height as the light guide plate 130, although not limited thereto. For example, the upper end of the sidewall structure of the bottom chassis 110 may be at the same height as the optical sheet 140. In this case, "H1" is equal to "K". Alternatively, the upper end of the sidewall structure of the bottom chassis 110 may be located higher or lower than the light guide plate 130.

To allow the mold frame 160 to be spaced apart from the optical sheet 140 by a predetermined distance, the height of the anti-contact protrusions 152, 154, 156 and 158 may be determined based on the height H1 of the sidewall structure of the bottom chassis 110. For example, if the height H1 of the sidewall structure of the bottom chassis 110 is reduced, the height of the anti-contact protrusions 152, 154, 156 and 158 may be increased. On the other hand, if the height H1 of the sidewall structure of the bottom chassis 110 is increased, the height of the anti-contact protrusions 152, 154, 156 and 158 may be reduced.

In the above-described embodiment, since the anti-contact protrusions 152, 154, 156 and 158 support the mold frame 160, the mold frame 160 does not come into direct contact with the front surface of the optical sheet 140. This may prevent damage to the front surface of the optical sheet 140 due to contact between the mold frame 160 and the optical sheet 140.

FIG. 7 illustrates a display device according to an embodiment and more particularly, a display device including the backlight unit illustrated in FIG. 1.

Referring to FIG. 7, the display device includes a backlight unit 710 and a liquid crystal panel 720. The backlight unit 710 is identical to that as described above with reference to FIGS. 1 to 6 and thus, a description thereof will be omitted to avoid repetition.

The liquid crystal panel 720 is seated on an upper end of the mold frame 160 and is disposed on an upper surface (or the front surface) of the optical sheet 140. The liquid crystal panel 720 is configured such that liquid crystals are filled between glass substrates and polarizing plates are disposed respectively on both the glass substrates to polarize light. Here, the liquid crystals are regularly arranged organic molecules having properties between solid and liquid and thus, having fluidity. The molecular arrangement of liquid crystals is changed by an exterior electric field, enabling display of an image. A color filter (not shown) may be provided on a front surface of the liquid crystal panel 720.

As is apparent from the above description, a backlight unit and a display device according to the above described embodiments have the effect of preventing damage to a reflective sheet due to contact between the reflective sheet and a top cover.

It will be apparent to those skilled in the art that various modifications and variations can be made in the embodiment without departing from the spirit or scope of the embodiments. Thus, it is intended that the embodiment covers the modifications and variations of this embodiment provided they come within the scope of the appended claims and their equivalents.

What is claimed is:

1. A backlight unit comprising:
a semiconductor light emitting device;
a light guide plate to guide light irradiated from the semiconductor light emitting device;
an optical sheet disposed on a first surface of the light guide plate;
a bottom chassis disposed on a second surface of the light guide plate;
a frame disposed on a surface of the optical sheet; and
a protrusion disposed between the bottom chassis and the frame, the protrusion providing the frame to be spaced apart from the surface of the optical sheet,
wherein the protrusion is spaced apart from the light guide plate and the optical sheet,
wherein the semiconductor light emitting device is disposed on two edge sides of the bottom chassis, and wherein the protrusion is disposed at another two edge sides of the bottom chassis not corresponding to the semiconductor light emitting device.

2. The backlight unit according to claim 1, wherein the bottom chassis includes a bottom body parallel to the light guide plate and a sidewall structure disposed at an edge of the bottom body, the sidewall structure being parallel to a third surface of the light guide plate.

3. The backlight unit according to claim 2, wherein the protrusion is disposed on the sidewall structure.

4. The backlight unit according to claim 2, wherein the protrusion is disposed on a surface of the sidewall structure.

5. The backlight unit according to claim 2, wherein the frame includes a vertical portion contacting with the sidewall structure and a rim portion extending from the vertical portion, the rim portion surrounds an edge region of the surface of the optical sheet.

6. The backlight unit according to claim 5, wherein the protrusion contacts with the rim portion.

7. The backlight unit according to claim 6, wherein the frame includes a protrusion inserting recess disposed in a surface of the rim portion at a position corresponding to the protrusion so as to be coupled with the protrusion.

8. The backlight unit according to claim 1, wherein the protrusion is integrally disposed with the bottom chassis.

9. The backlight unit according to claim 1, wherein the protrusion has a dot shape.

10. The backlight unit according to claim 1, wherein the frame includes synthetic resin.

11. The backlight unit according to claim 1, further comprising a reflective sheet disposed between the light guide plate and the bottom chassis, and a distance between the frame and the optical sheet is 0.5 mm or less.

12. The backlight unit according to claim 1, wherein an upper end of the protrusion is located higher than the light guide plate.

13. The backlight unit according to claim 1, further comprising a bracket attached to an edge side of the bottom chassis such that the semiconductor light emitting device is fixed to the bracket.

14. A display device comprising:
a semiconductor light emitting device;
a light guide plate to guide light irradiated from the semiconductor light emitting device;
an optical sheet disposed on a first surface of the light guide plate;
a bottom chassis disposed on a second surface of the light guide plate;
a frame disposed on a surface of the optical sheet;
a protrusion disposed between the bottom chassis and the frame, the protrusion contacting the frame to be spaced apart from the surface of the optical sheet, the protrusion spaced apart from the light guide plate and the optical sheet; and
a liquid crystal panel disposed on a surface of the frame,
wherein the semiconductor light emitting device is disposed on two edge sides of the bottom chassis, and
wherein the protrusion is disposed at another two edge sides of the bottom chassis not corresponding to the semiconductor light emitting device.

15. The display device according to claim 14, wherein the bottom chassis includes a bottom body parallel to the light guide plate and a sidewall structure disposed at an edge of the bottom body, the sidewall structure being parallel to a third surface of the light guide plate, and the protrusion is disposed on the sidewall structure.

16. The display device according to claim 15, wherein the protrusion is disposed on a surface of the sidewall structure.

17. The display device according to claim 15, wherein the frame includes a vertical portion coming into contact with the sidewall structure and a rim portion extending from the vertical portion, the rim portion surrounds an edge region of the surface of the optical sheet, and the protrusion comes into contact with the rim portion.

18. The display device according to claim 17, wherein the frame includes an protrusion inserting recess disposed in a surface of the rim portion at a position corresponding to the protrusion so as to be coupled with the protrusion.

* * * * *